United States Patent [19]

Behnke et al.

[11] Patent Number: 4,814,440
[45] Date of Patent: Mar. 21, 1989

[54] PROCESS FOR PRODUCING EXTRACTIVE-MATERIAL-REDUCED CELLULOSE

[75] Inventors: Joachim Behnke, Radevormwald; Helmut Schulze, Grosswallstadt; Ernst Berg; Michael Pelger, both of Wuppertal, all of Fed. Rep. of Germany

[73] Assignee: Akzo NV, Arhhem, Netherlands

[21] Appl. No.: 103,345

[22] Filed: Oct. 1, 1987

[30] Foreign Application Priority Data

Oct. 3, 1986 [DE] Fed. Rep. of Germany ....... 3633737

[51] Int. Cl.$^4$ .......................... C08B 1/02; C08B 16/00
[52] U.S. Cl. ......................................... 536/56; 536/57
[58] Field of Search .................................... 536/56, 57

[56] References Cited

U.S. PATENT DOCUMENTS 4,673,506  6/1987  Henne et al. .................... 210/636

FOREIGN PATENT DOCUMENTS

| 323241 | 6/1932 | Canada . |
| 0012630 | 6/1980 | European Pat. Off. . |
| 337672 | 4/1922 | Fed. Rep. of Germany . |
| 344749 | 6/1922 | Fed. Rep. of Germany . |
| 394436 | 4/1924 | Fed. Rep. of Germany . |
| 7829409 | 10/1978 | Fed. Rep. of Germany . |
| 3317037 | 11/1984 | Fed. Rep. of Germany . |
| 3319504 | 11/1984 | Fed. Rep. of Germany . |
| 3341113 | 5/1985 | Fed. Rep. of Germany . |
| 95825 | 8/1922 | Switzerland . |
| 185433 | 9/1922 | United Kingdom . |

OTHER PUBLICATIONS

"Der Papier-Fabrikant", 1937, Heft 1/2, pp. 2-5.
"Chemische Technologie Der Zellstoff-Und Papierherstellung", VEB Fachbuchverlag Leipzig, 1967, pp. 425-428.
"Role of Dialyzer Contaminants in the Allergic Epiphenomena of Hemodialysis", Ward et al., *Artificial Organs*, 8, pp. 338-345.
"Hollow-Fiber Dialyzers and Their Pyrogenicity Testing by Limulus Amebocyte Lysata", Henne et al., *Artificial Organs*, 8, pp. 299-305.
"Comparison of Chemical Analyses of Hollow-Fiber Dialyzer Extracts", Pearson et al., *Artificial Organs*, 8, pp. 291-298.

*Primary Examiner*—John Kight
*Assistant Examiner*—Nathan M. Nutter
*Attorney, Agent, or Firm*—Parkhurst, Oliff & Berridge

[57] ABSTRACT

The invention relates to a process for obtaining extractive-material-reduced cellulose with a low LAL reaction, wherein cotton linters or wood pulps, subsequent to the customary digesting treatment, are subjected for 1 to 10 hours to hydraulic washing with water, lye with a concentration of less than 5 g/l alkali content, or with a diluted acid containing less than 5 g/l acid at temperatures of 120° to 180° C. and under a pressure of 2 to 20 bar.

The resulting cellulose is used for the manufacture of hemodialysis and/or hemofiltration membranes in the form of flat membranes, tubular membranes or hollow filaments by regeneration of a cellulose solution containing the extractive-material-reduced cellulose with a low LAL reaction.

The regeneration may be effected from solutions of cellulose cuoxam, cellulose xanthate, or solutions of cellulose in tertiary amine oxide or in an LiCl-containing solvent.

12 Claims, No Drawings

PROCESS FOR PRODUCING EXTRACTIVE-MATERIAL-REDUCED CELLULOSE

TECHNICAL FIELD

The invention relates to a process for obtaining extractive-material-reduced cellulose with a low LAL reaction, and to the use of this cellulose for hemodialysis and/or hemofiltration membranes.

BACKGROUND OF THE INVENTION

When it comes to qualify, hemodialysis and/or hemofiltration membranes have to meet the highest purity requirements. Thus, the alpha-cellulose content must be at least 98%, the degree of polymerization 500 or more, and the contents still remaining in the cellulose may not have any toxic or detrimental medical effects on a dialysis patient.

In the hemodialysis membranes made of regenerated cellulose currently available on the market, the aqueous extracts in an HPLC analysis show a peak for relatively high-molecular-weight substances ranging from 20,000 to 90,000 daltons (Ward, Feldhoff, and Klein: "Role of Dialyzer Contaminants in the Allergic Epiphenomena of Hemodialysis"; Artif. Org. 8, 338 (1984)).

It has also been shown that these extracts show very high positive values in tests with limulus amebocytes lysates (LAL) made by certain manufacturers, such as Travenol or Concept (Heidelberg). The test with Mallinckrodt's LAL shows a negative reaction. Although these tests are normally used for detecting endotoxins and thereby pyrogens, it was demonstrated in pyrogen tests on rabbits that this is a falsely positive reaction. Further experiments showed that this could in all probability have been oligomeric or polymeric sugars (Henne, Schulze, Pelger, Tretzel, and von Sengbusch: "Hollow Fiber Dialyzers and Their Pyrogenicity Testing by Limulus Amebocyte Lysates"; Pearson, Bohon, Lee, Brusser, Sagona, Dawe, Jakubowski, Morrison, and Dinarello: "Comparison of Chemical Analyses of Hollow Fiber Dialyzer Extracts"; Artif. Org. 8, 291 (1984).

Heretofore, it was only possible to reduce the portion of extractable, high-molecular weight substances by washing with water on the finished dialyzer and retaining the membrane properties by a special post-treatment (DE-OS No. 33 19 504). This process is very costly, because the treatment must be effected on each individual dialyzer.

The extractive materials, the details of which are still unknown and which show the falsely positive LAL reaction described above, are present in concentrations on the order of ng/g cellulose, and thus can be detected only by such sensitive test methods as the LAL test. The compositions of another group of extractive materials that can be detected in a concentration of less than 0.1% of the cellulose could also heretofore not as yet be clearly identified. These substances can be detected by HPLC chromatography within the molecular-weight range of 20,000 to 90,000 daltons.

SUMMARY OF THE INVENTION

The problem was posed of eliminating the extractive materials in question in the raw material itself and rendering a single post-treatment of dialyzers unnecessary. This problem was solved with a process which is characterized by the fact that refined cotton linters or wood pulps, subsequent to the customary digesting treatment, are subjected to hydraulic washing with water, lye at a concentration of less than 5 g/l alkali content or a diluted acid containing less than 5 g/l acid, at temperatures of 120° to 180° C. and under a pressure of 2 to 20 bar for 1 to 10 hours.

A surprising finding was that, as a result of this simple intermediate stage of hydraulic washing, the extractive materials can be removed and dialysis membranes, in which said extractive materials can practically no longer be detected, can be made from the thusly treated cellulose. The LAL reaction is reduced to a fraction of the value usually measured. Whereas, after a hot-water sterilization and, in some cases, even after the above-mentioned extraction process, extractive materials are found to a greater or lesser extent on the dialyzer when carrying out a new extraction; this is not the case with the process embodying the invention.

DETAILED DESCRIPTION OF PREFERRED EMBODIMENTS OF THE INVENTION

When obtaining cellulose from cellulosic material such as wood or cotton linters, a digesting treatment is usually carried out during the process. The intent is to bring the alpha-cellulose content to the highest possible value. In the case of wood pulp, the digesting treatment is usually carried out in accordance with the sulfite or sulfate process.

Treatments for refining cellulose with diluted acids at high temperatures within the scope of the customary digesting process are old in the art.

Thus, for example, West German Patent No. 337,672 teaches the boiling of raw brown cellulose (apparently lignin-containing cellulose) with 0.5% HCL in an open vat. The cellulose thus obtained is to be used for making synthetic textile fibers instead of pure raw cellulose, such as bleached flax, bleached cotton or ramie fibers.

West German Patent No. 344,749 (Addition to West German Pat. No. 337,672) describes, for example, an appropriate boiling treatment with 0.2% HCl or $H_2SO_4$ at 0.5 bar gauge.

West German Patent No. 394,436 teaches another process, in which bleached commercial wood pulp to be converted into xanthate is treated with a highly diluted hydrochloric or sulfuric acid. For example, the cellulose is heated for about 2 hours to about 100° C. in an open vat with 0.5% hydrochloric acid. The treatment serves to enable one to prepare solutions containing 15 or more percent cellulose, which suggests that the treatment leads to a reduction of the degree of polymerization.

Likewise, Swiss Patent No. 95,825 teaches a process of pretreating wood pulp, which is to be used for manufacturing viscose, with acids at up to 0.5 bar gauge. Here, too, raw, brown, apparently lignin-containing, cellulose is treated.

Canadian Patent No. 323,241 teaches a process in which digested, unrefined pulp slurry, such as results from the sulfite or sulfate process or with cotton linters, is treated at temperatures above 175° C. with water or with an alkali solution containing 0.1 to 0.2% of an alkaline substance such as sodium carbonate. This "kiering" process is the conclusion of wood-pulp-digesting processes known from the prior art.

Admittedly, the wood pulps obtained in accordance with the processes described above may have a very high alpha-cellulose content. The extractive materials discussed above, which in the HPLC analysis show a peak for relatively high-molecular-weight substances ranging from 20,000 to 90,000 daltons or a falsely positive LAL reaction, are not removed in the prior art processes. The hydraulic washing as taught by the invention is additionally effected after the digesting treatment mentioned earlier.

Preferably, this hydraulic washing at temperatures ranging from 150° to 170° C. is carried out for 2 to 4 hours under a pressure of 5 to 10 bar.

Although the hydraulic washing with pure water leads to excellent results, it has proved to be advantageous under specified conditions to carry it out with a diluted lye or diluted acid. In this case, the alkali concentration must remain below 5 g/l, preferably below 2 g/l, or the acid concentration below 5 g/l (calculated as $H_2SO_4$), preferably below 1.5 g/l, in order to prevent the cellulose from being damaged.

The use of diluted acids whose $pK_a$ value is greater than 2.5, particularly greater than 4.0, has very advantageous effects for reducing the extractive materials with a falsely positive LAL reaction. Malonic acid, nitric acid, butyric acid, hydroxypropionic acid and tartaric acid have proved to be very suitable. The degree of polymerization is largely maintained when using these acids.

Because of the reduction of extractive materials and the reduced LAL reaction, the cellulose obtained in accordance with the invention is very suitable for use in the manufacture of hemodialysis and/or hemofiltration membranes in the form of flat membranes, tubular membranes or hollow threads by regeneration of a cellulose solution. Here, the regeneration can take place from solutions of the cellulose in solvents for the cellulose containing cellulose xanthate, tertiary amine oxide or LiCl. The regeneration from cuoxam solutions (tetraminecopper dihydroxide, copper tetramine hydroxide) is preferred, because for hemodialysis purposes cellulose regenerated in accordance with the cuoxam process offers special advantages due to the selection of its dialytic properties.

The invention will now be described with reference to the examples below.

COMPARISON EXAMPLES

One dialyzer each of the AM 1000 U, AM Neo 1000 M (hollow-filament manufacturer Asahi), TAF 10 (hollow-filament manufacturer Terumo), CF 1211 (hollow-filament manufacturer Enka) was extracted by recirculating for 3 hours 300 ml of water on the blood side and 1000 ml of water on the dialysis side. 10 ml of the solution was removed for determining the LAL-reactive substance, the rest (about 0.8 ml) was concentrated and absorbed in 20 ml of an aqueous 0.01 molar $NaClO_4$ solution.

50 ml of this solution was studied in a TSK-2000 SW column (7.5×600 mm) with preliminary column (7.5×100 mm) of the KB Instrument Company GmbH with a flow of 0.5 ml/min. A differential refractometer made by the Knaur Company was used as a detector in the measuring range 2. A 0.01 molar $NaClO_4$ solution with 0.05% sodium dodecyl sulfate was used as the solvent.

In order to determine the concentration of extracts, the voltages measured on the differential refractometer were recorded and expressed in terms of 1 $m^2$ of membrane area. Thus, the concentrations listed in Table 2 are indicated in the dimension $mV/m^2$ membrane area and can be compared directly with each other. The calibration of the column occurred with pullulans of Show Denko K.K., Japan.

The proportion of LAL-reactive material was determined with the "Pyrogel" lysate made by Concept. Since the LAL test is calibrated with reference to pyrogenic substances and not to the extracts considered here, the absolute values fluctuate considerable with different charges of the test material. However, relative LAL values referred to a standard extract are readily reproducible. Therefore, for each specimen a parallel measurement was carried out with a standard extract (from Cuprophan $^{(R)}$ membranes) and the measured value of the specimen was referred to this standard extract. The relative LAL values so obtained are listed in Table 2.

EXAMPLES 1-5

After the customary kiering process, linter cellulose was subjected to one more single or multiple hydraulic washing with water or with a diluted NaOH solution (2 g/l) in accordance with the conditions listed in Table 1.

TABLE 1

| Example | Conditions of Hydraulc washing |
|---|---|
| 1 | Hydraulic washing with water for 2 hours at 165° C./8 bar |
| 2 | Hydraulic washing with a diluted caustic soda solution; 2 g/l for 2 hours at 165° C./8 bar |
| 3 | Hydraulic washing with water for 6 hours at 165° C./8 bar |
| 4 | Hydraulic washing twice with water 30 minutes each time, 130° C./ bar |
| 5 | Hydraulic washing with water for 24 hours at 165° C./8 bar |

After subsequent bleaching, the linter cellulose from a cuoxam solution was processed into hollow fibers having a wall 8 microns thick and an inside diameter of 200 microns. The dialyzers produce therefrom, each with 1 $m^2$ effective surface, were extracted in accordance with the comparison examples and studied via HPLC for high-molecular extracts and LAL-reactive material.

The results are compiled in Table 2. High-molecular extracts and LAL-reactive material could therefore be significantly reduced compared with commercial dialyzers.

TABLE 2

| | HPLC peak height RI (mV/m2) | LAL test according to Concept relative values |
|---|---|---|
| Comparison Example | | |
| TAF 10 | 7.9 | 1.18 |
| AM Neo 1000 M | 5.4 | 1.15 |
| AM 1000 U | 6.0 | 0.76 |
| CF 1211 | 12.5 | 1.00 |
| Examples | | |
| Example 1 | 3.0 | 0.48 |
| Example 2 | 0.5 | 0.24 |
| Example 3 | 1.0 | 0.12 |
| Example 4 | 2.7 | 0.21 |
| Example 5 | 0.5 | 0.20 |

EXAMPLE 6

Malonic acid was added to a kiered slightly-alkaline-reacting cotton-linter cellulose subjected to the kier boiling until the pH was 1.5. This was followed by hydraulic washing for 3 hours at 165° C. and 8 bar. After subsequent bleaching, the cellulose was processed into hollow fibers having a wall 8 microns thick. Extracts were obtained from these hollow fibers and analyzed. The degree of polymerization of the cellulose in the hollow fibers was 778. The HPLC height RI was ascertained as being 0.6 mV/m$^2$ and the LAL test according to Concept produced a relative value of 0.12.

What is claimed is:

1. A process for the production of extractive-material-reduced cellulose with a low LAL reaction for the manufacture of membranes, comprising subjecting refined cotton linters or wood pulps to a digesting treatment, and then to hydraulic washing for 1–10 hours at temperatures of 120°–180° C. and pressures of 2–20 bar with a member selected from the group consisting of water, lye in a concentration of less than 5 g/l alkali content, and a diluted acid in a concentration of less than 5 g/l acid content, thereby forming cellulose, and regenerating a solution of said cellulose.

2. The process of claim 1, further comprising making said membranes from said cellulose, said membranes being at least one member selected from the group consisting of hemodialysis membranes and hemofiltration membranes.

3. The process of claim 1, further comprising making said membranes from said cellulose, said membranes being selected from the group consisting of flat membranes, tubular membranes and hollow filament membranes.

4. The process of claim 1, wherein the hydraulic washing is effected at temperatures of 150° to 170° C. and pressures of 5 to 10 bar for 2 to 4 hours.

5. The process of claim 1, wherein the hydraulic washing is effected with a diluted acid containing less than 1.5 g/l acid.

6. The process of claim 1, wherein the hydraulic washing is carried out with diluted lye containing less than 2 g/l alkali.

7. The process of claim 1, wherein the hydraulic washing is carried out with diluted acids having a pK$_a$ value of 2.5 or higher.

8. The process of claim 1, wherein said cellulose solution is a cuoxam solution.

9. The process of claim 1, wherein said cellulose solution is a solution of cellulose xanthate.

10. The process of claim 1, wherein said cellulose solution is a solution of the cellulose in tertiary amine oxide.

11. The process of claim 1, wherein said cellulose solution is a solution of cellulose in an LiCl-containing solvent.

12. Extractive-material-reduced cellulose prepared according to the process of claim 1.

* * * * *

UNITED STATES PATENT AND TRADEMARK OFFICE
CERTIFICATE OF CORRECTION

PATENT NO. : 4,814,440

DATED : March 21, 1989

INVENTOR(S) : Joachim Behnke; Helmut Schulze; Ernst Berg; Michael Pelger

It is certified that error appears in the above-identified patent and that said Letters Patent is hereby corrected as shown below:

Column 1, line 13, change "qualify" to --quality--.
Column 4, line 8, change "flucturate considerable" to --fluctuate considerably--.
Column 4, sixth line of TABLE 1, change "6 hours" to --3 hours--.

Signed and Sealed this

Seventh Day of November, 1989

Attest:

JEFFREY M. SAMUELS

Attesting Officer
Acting Commissioner of Patents and Trademarks